US012031535B2

United States Patent
Chida et al.

(10) Patent No.: US 12,031,535 B2
(45) Date of Patent: Jul. 9, 2024

(54) COMPRESSOR

(71) Applicant: DAIKIN INDUSTRIES, LTD., Osaka (JP)

(72) Inventors: Jun Chida, Osaka (JP); Kiyofumi Shirouzu, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 377 days.

(21) Appl. No.: 17/271,413

(22) PCT Filed: Jan. 28, 2020

(86) PCT No.: PCT/JP2020/003008
§ 371 (c)(1),
(2) Date: Feb. 25, 2021

(87) PCT Pub. No.: WO2020/158743
PCT Pub. Date: Aug. 6, 2020

(65) Prior Publication Data
US 2021/0301814 A1   Sep. 30, 2021

(30) Foreign Application Priority Data

Jan. 31, 2019   (JP) .................................. 2019-015612

(51) Int. Cl.
*F04B 49/10*   (2006.01)
*F04B 35/04*   (2006.01)
(Continued)

(52) U.S. Cl.
CPC .............. *F04B 49/10* (2013.01); *F04B 35/04* (2013.01); *F04B 39/121* (2013.01); *F04B 39/14* (2013.01);
(Continued)

(58) Field of Classification Search
CPC ........ F04B 49/10; F04B 35/04; F04B 39/121; F04B 39/14; F04B 49/06; H02K 7/14;
(Continued)

(56) References Cited

U.S. PATENT DOCUMENTS 2,376,863 A * 5/1945 Bussmann ............. H02K 11/25
318/473
5,664,959 A * 9/1997 Duell ................. H01R 13/5219
439/680
(Continued)

FOREIGN PATENT DOCUMENTS

EP   0 769 794 A1   4/1997
JP   2-115580 A   4/1990
(Continued)

OTHER PUBLICATIONS

JPH02115580 translation (Year: 2023).*
(Continued)

*Primary Examiner* — Charles G Freay
*Assistant Examiner* — David N Brandt
(74) *Attorney, Agent, or Firm* — Global IP Counselors, LLP

(57) ABSTRACT

A compressor includes a casing accommodating a compression mechanism, a detection device having a detection face configured to detect an internal state of the casing, an elastic member, and a cover mounted to the casing to cover the detection device and a part of the elastic member. The detection face is located opposite an outer peripheral face of the casing. The elastic member includes a first portion overlapping the detection device and a second portion not overlapping the detection device, as seen in plan view. The cover is configured to press the second portion of the elastic
(Continued)

member against the casing, with the first portion of the elastic member pressing the detection device against the casing.

12 Claims, 11 Drawing Sheets

(51) Int. Cl.
*F04B 39/12* (2006.01)
*F04B 39/14* (2006.01)
*F04B 49/06* (2006.01)
*F04C 28/06* (2006.01)
*F04C 28/28* (2006.01)
*H02K 11/25* (2016.01)
*H02K 11/26* (2016.01)
*H02K 11/27* (2016.01)

(52) U.S. Cl.
CPC ............... *F04B 49/06* (2013.01); *F04C 28/06* (2013.01); *F04C 28/28* (2013.01); *F04C 2270/19* (2013.01); *H02K 11/25* (2016.01); *H02K 11/26* (2016.01); *H02K 11/27* (2016.01)

(58) Field of Classification Search
CPC ........ H02K 11/25; H02K 11/26; H02K 11/27; H02K 11/28; H02K 11/30; H02K 11/33; H02K 11/38; H02K 11/40; F04C 28/06; F04C 28/28; F04C 2270/19
See application file for complete search history.

(56) References Cited

U.S. PATENT DOCUMENTS

| | | | | |
|---|---|---|---|---|
| 6,215,214 B1 * | 4/2001 | Fisher | ............... | H02K 11/23 |
| | | | | 310/90 |
| 2002/0075665 A1 * | 6/2002 | Jang | ............. | F04C 23/008 |
| | | | | 361/816 |

FOREIGN PATENT DOCUMENTS

| | | | | |
|---|---|---|---|---|
| JP | H02115580 | * | 4/1990 | ............. F04B 39/00 |
| JP | 7-310661 A | | 11/1995 | |
| JP | 8-240181 A | | 9/1996 | |
| JP | 9-112424 A | | 5/1997 | |
| JP | 10-153173 A | | 6/1998 | |
| JP | 2006-22760 A | | 1/2006 | |
| KR | 970002193 U | | 1/1997 | |
| KR | 20070019230 | * | 2/2007 | ............. F04B 39/00 |

OTHER PUBLICATIONS

KR20070019230 translation (Year: 2023).*
International Preliminary Report of corresponding PCT Application No. PCT/JP2020/003008 dated Aug. 12, 2021.
European Search Report of corresponding EP Application No. 20 74 8644.0 dated Jun. 9, 2021.
International Search Report of corresponding PCT Application No. PCT/JP2020/003008 dated Mar. 24, 2020.

* cited by examiner

COMPRESSOR

CROSS-REFERENCE TO RELATED APPLICATIONS

This U.S. National stage application claims priority under 35 U.S.C. § 119(a) to Japanese Patent Application No. 2019-015612, filed in Japan on Jan. 31, 2019, the entire contents of which are hereby incorporated herein by reference.

BACKGROUND

Field of the Invention

The present disclosure relates to compressors.

Background Information

Some of conventional compressors include an overload protection device, an elastic member causing the overload protection device to securely adhere to a surface of the compressor, and a terminal cover accommodating the overload protection device (refer to JP 7-310661 A). The terminal cover is mounted to the compressor with the elastic member interposed between the terminal cover and an upper-end plane of the overload protection device. The elastic member is thus compressed to press the overload protection device against the surface of the compressor.

SUMMARY

However, JP 7-310661 A does not describe a positioning mechanism for the overload protection device. Therefore, a misalignment of the overload protection device relative to the compressor impairs the adhesion between the overload protection device and the surface of the compressor.

The present disclosure proposes a compressor capable of inhibiting lowering of adhesion between a detection device and a surface of a compressor.

The present disclosure provides a compressor including:
a casing accommodating a compression mechanism;
a detection device having a detection face for detecting an internal state of the casing, the detection face being located opposite an outer peripheral face of the casing;
an elastic member including a first portion overlapping the detection device and a second portion not overlapping the detection device as seen in plan view; and
a cover mounted to the casing to cover the detection device and a part of the elastic member,
wherein
the cover is configured to press the second portion of the elastic member against the casing, with the first portion of the elastic member pressing the detection device against the casing.

The elastic member deforms when the cover presses the second portion of the elastic member against the casing. Then, the elastic member generates a reaction force to return to its original shape, and this reaction force from the first portion of the elastic member acts on the detection device. The detection device is thus pressed against the casing. According to the present disclosure, the first portion of the elastic member presses the detection device against the casing. This allows lowering of adhesion between the detection face of the detection device and the outer peripheral face of the casing to be inhibited.

In the compressor according to an aspect,
the elastic member includes:
a mounting hole into which the detection device is inserted; and
a projection disposed on apart around a peripheral edge of the mounting hole and protruding toward the casing.

According to this aspect, the projection secures a spacing between the part around the peripheral edge of the mounting hole and the casing. This increases an amount of deformation of the elastic member as compared with a case where the elastic member includes no projection. As a result, a reaction force acting on the detection device becomes larger than a reaction force in the case where the elastic member includes no projection. Therefore lowering of adhesion between the detection face of the detection device and the outer peripheral face of the compressor is effectively inhibited.

In addition, the elastic member includes the mounting hole into which the detection device is inserted. This configuration avoids a misalignment of the detection device relative to the casing in the compressor.

In the compressor according to an aspect,
the detection device includes:
a detection device main body having the detection face; and
a support protruding from an outer peripheral face of the detection device main body,
the first portion of the elastic member overlaps the support of the detection device as seen in plan view, and
the detection device is pressed against the casing with the first portion of the elastic member biasing the support of the detection device toward the casing.

According to this aspect, the support supports the first portion of the elastic member. This inhibits a displacement of the first portion of the elastic member toward the casing when the second portion of the elastic member is pressed against the casing, resulting in that an amount of deformation of the elastic member is inhibited from decreasing. Thus, lowering of a reaction force that the elastic member applies to the detection device is inhibited.

In the compressor according to an aspect,
the support includes:
a base having a tubular shape and covering the outer peripheral face of the detection device main body; and
a flange disposed on an end, closer to the first portion, of the base.

According to this aspect, the base secures a spacing between the casing and the first portion of the elastic member supported by the flange of the support. This increases an amount of deformation of the elastic member with the second portion of the elastic member pressed against the casing, as compared with a case where the support includes no base. As a result, a reaction force that the elastic member applies to the detection device becomes larger than a reaction force in the case where the support includes no base. This effectively inhibits lowering of adhesion between the detection face of the detection device and the outer peripheral face of the casing.

In the compressor according to an aspect,
the support has a thickness larger than a thickness of the second portion of the elastic member.

According to this aspect, the thickness of the support is larger than the thickness of the second portion of the elastic member. This configuration secures a spacing between the casing and the first portion of the elastic member supported by the support, as compared with a case where the thickness of the support is smaller than the thickness of the second portion of the elastic member. The above configuration thus increases an amount of deformation of the elastic member with the elastic member pressed against the casing. As a result, a reaction force which the elastic member applies to the detection device becomes larger than a reaction force in the case where the thickness of the support is smaller than the thickness of the second portion of the elastic member. Therefore lowering of adhesion between the detection face of the detection device and the outer peripheral face of the casing is effectively inhibited.

In the compressor according to an aspect, the detection device includes:
- a detection device main body having the detection face; and
- a step disposed on an outer peripheral face of the detection device main body,
- the first portion of the elastic member overlaps the step of the detection device as seen in plan view, and
- the detection device is pressed against the casing, with the first portion of the elastic member biasing the step of the detection device toward the casing.

According to this aspect, the step supports the first portion of the elastic member. This inhibits a displacement of the elastic member toward the casing when the second portion of the elastic member is pressed against the casing, resulting in that the amount of deformation of the elastic member is inhibited from decreasing. This inhibits lowering of a reaction force which the elastic member applies to the detection device.

In the compressor according to an aspect,
the detection device has an end face opposite to the detection face,
the first portion of the elastic member overlaps at least a part of the end face as seen in plan view, and
the detection device is pressed against the casing, with the first portion of the elastic member biasing at least a part of the end face of the detection device toward the casing.

In the compressor according to an aspect,
the elastic member includes a tubular portion protruding in a direction opposite to the casing and surrounding an outer peripheral face of the detection device.

According to this aspect, the tubular portion covers the outer peripheral face of the detection device. This configuration avoids contact of the detection device with peripheral components and the like, to thereby protect the detection device.

The compressor according to an aspect further includes a spacer member interposed between the detection face of the detection device and the outer peripheral face of the casing.

According to this aspect, the spacer member interposed between the detection face of the detection device and the outer peripheral face of the casing secures a spacing between the first portion of the elastic member and the casing. This increases an amount of deformation of the elastic member as compared with a case where the compressor includes no spacer member. As a result, a reaction force acting on the detection device becomes larger than a reaction force in the case where the compressor includes no spacer member. Therefore, lowering of adhesion between the detection face of the detection device and the outer peripheral face of the compressor is effectively inhibited.

In the compressor according to an aspect, the detection device is an overload protection device.

DETAILED DESCRIPTION OF EMBODIMENT(S)

With reference to the attached drawings, a description will be given of a compressor according to an embodiment of the present disclosure.

First Embodiment (General Configuration)

Figure 1:
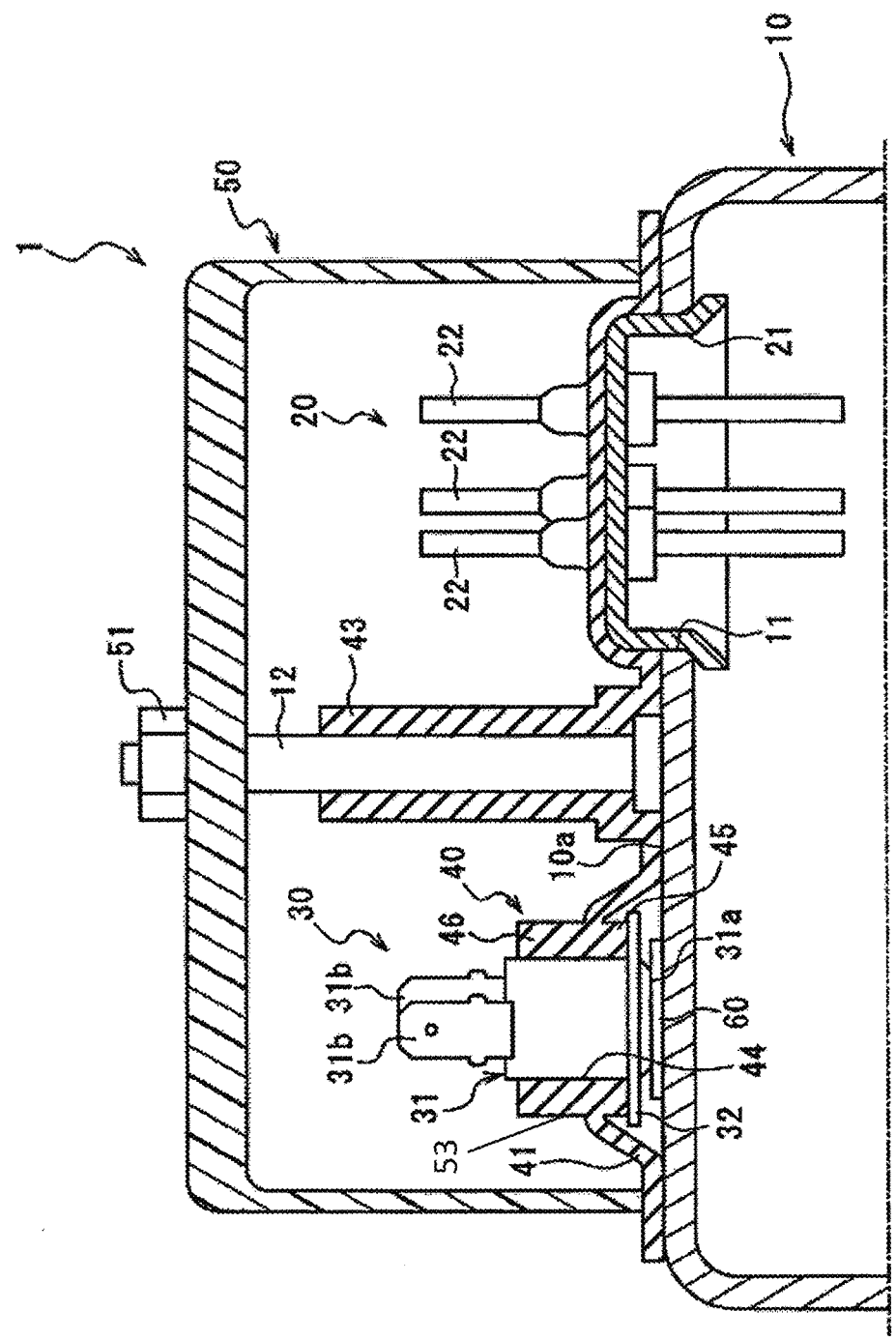
FIG. 1 is a schematic longitudinal sectional view of an upper portion of a compressor according to a first embodiment of the present disclosure.

FIG. 1 is a longitudinal sectional view of an upper portion of a compressor 1 according to the present embodiment.

Figure 2:
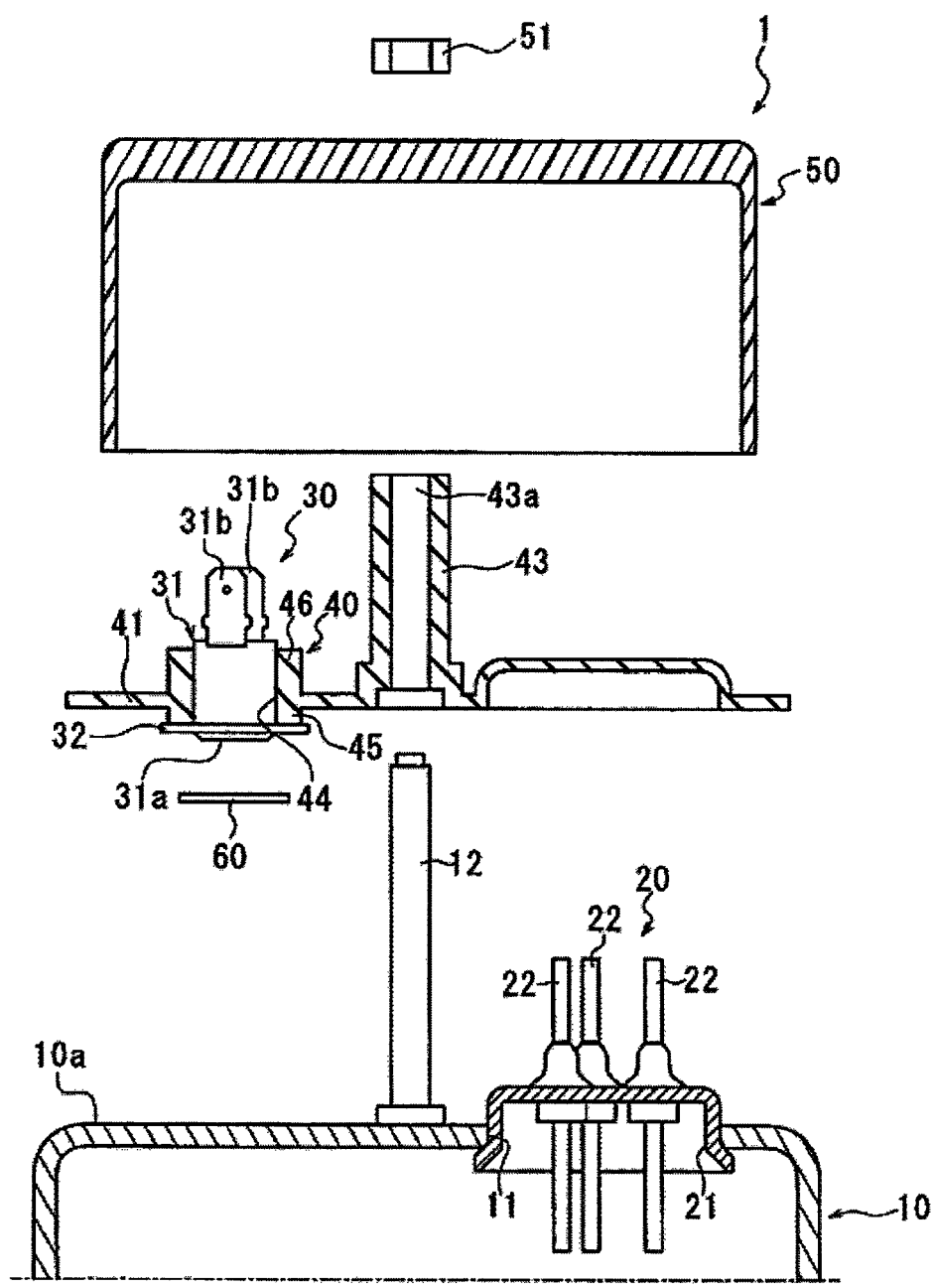
FIG. 2 is a schematic exploded longitudinal sectional view of the upper portion of the compressor according to the first embodiment.

FIG. 2 is an exploded longitudinal sectional view of the upper portion of the compressor 1 according to the present embodiment.

With reference to FIGS. 1 and 2, the compressor 1 includes a casing 10 accommodating a compression mechanism (not illustrated), and a terminal unit 20 disposed in the casing 10.

The casing 10 is a sealed enclosure made of a metal. The casing 10 accommodates therein the compression mechanism (not illustrated) as described above and a motor (not illustrated) configured to drive the compression mechanism. The casing 10 has, in its upper portion, a terminal unit mounting hole 11 into which the terminal unit 20 is fittable. The casing 10 has an upper face 10a on which a stud 12 is disposed upright so as to extend outside of the casing 10. The upper face 10a of the casing 10 is an example of an outer peripheral face of a casing according to the present disclosure.

The terminal unit 20 is a hermetic terminal. The terminal unit 20 includes a terminal unit main body 21 and three pin terminals 22 inserted into the terminal unit main body 21.

The terminal unit main body 21 is a one end-closed tubular member made of a metal. The terminal unit main body 21 is fixed by welding to an inner periphery of the terminal unit mounting hole 11 with the terminal unit main body 21 fitted into the terminal unit mounting hole 11 in the casing 10.

Each of the pin terminals 22 is made of an electrically conductive material such as a metal. The pin terminals 22 are inserted into insertion holes (not illustrated) in the terminal unit main body 21, and are fixed to the terminal unit main body 21.

The compressor 1 includes an overload protection device 30 placed on the upper face 10a of the casing 10, and a gasket 40 placed on the upper face 10a of the casing 10 so as to cover the casing 10, the terminal unit 20, and the overload protection device 30. The overload protection device 30 is an example of a detection device according to the present disclosure. The gasket 40 is an example of an elastic member according to the present disclosure. FIGS. 1 and 2 do not illustrate an internal structure of the overload protection device 30.

The overload protection device 30 is configured to detect a temperature inside the casing 10 and to stop the compressor 1 if the detected temperature is higher than a predetermined temperature. The overload protection device 30 is, for example, a bimetal thermostat. The overload protection device 30 includes an overload protection device main body 31 and a rib 32 protruding from an outer peripheral face of the overload protection device main body 31. The overload protection device main body 31 is an example of a detection device main body according to the present disclosure. The rib 32 is an example of a support according to the present disclosure.

The overload protection device main body 31 has, on one of end faces (a lower end face in FIGS. 1 and 2), a detection face 31a for detecting an internal state of the casing 10. The overload protection device main body 31 also has, on the other end face (an upper end face in FIGS. 1 and 2), tab terminals 31b connected to a control board (not illustrated) via a wire (not illustrated). The overload protection device 30 is placed such that the detection face 31a is located confronting the upper face 10a of the casing 10.

The rib 32 of the overload protection device 30 is located opposite the casing 10 across the detection face 31a of the overload protection device main body 31. In other words, the detection face 31a is closer to the casing 10 than the rib 32 is. The rib 32 of the overload protection device 30 is separated from a surface of the casing 10 when the overload protection device 30 is mounted to the casing 10. The rib 32 of the overload protection device 30 is disposed around the entire circumference of the overload protection device main body 31.

The gasket 40 is a member made of an insulating and elastic material such as silicone rubber. The gasket 40 includes a gasket main body 41 having a sheet shape.

The gasket 40 has three pin terminal insertion holes 42 (see FIG. 3) into which the three pin terminals 22 of the terminal unit 20 are respectively inserted. A region around the pin terminal insertion holes 42 is formed to protrude in a direction opposite to the casing 10 in accordance with a shape of the terminal unit main body 21 of the terminal unit 20.

The gasket 40 includes a tubular portion 43 surrounding an outer periphery of the stud 12. The tubular portion 43 is disposed upright on the gasket main body 41 of the gasket 40 so as to extend in the direction opposite to the casing 10. As illustrated in FIG. 2, the gasket 40 has a stud insertion hole 43a which is defined by an inner peripheral face of the tubular portion 43 and into which the stud 12 is inserted.

The gasket 40 has a mounting hole 44 for mounting the overload protection device 30. The mounting hole 44 in the gasket 40 is slightly smaller than an outside diameter of the overload protection device 30. The gasket 40 includes a projection 45 disposed on a part around a peripheral edge of the mounting hole 44. The projection 45 is closer to the casing 10 than the gasket main body 41 is. The gasket 40 also includes a tubular portion 46 disposed on the part around the peripheral edge of the mounting hole 44. The tubular portion 46 protrudes in the direction opposite to the casing 10.

The projection 45 of the gasket 40 is supported by the rib 32 of the overload protection device 30.

The tubular portion 46 is disposed upright on the gasket main body 41 so as to surround an outer peripheral face of the overload protection device 30.

The compressor 1 includes a terminal cover 50 fixed to the casing 10 so as to cover the terminal unit 20, the overload protection device 30, and a part of the gasket 40. The terminal cover 50 has an insertion hole (not illustrated) into which the stud 12 is inserted. The terminal cover 50 is fixed to the casing 10, with the stud 12 inserted into the insertion hole and screwed into a nut 51. At this time, the terminal cover 50 presses the gasket 40 against the casing 10. In other words, the gasket 40 is held between the terminal cover 50 and the casing 10. Since the gasket 40 is held between the terminal cover 50 and the casing 10, an interface between the terminal cover 50 and the casing 10 is sealed with the gasket 40. The terminal cover 50 is an example of a cover according to the present disclosure.

In the present embodiment, the compressor 1 includes a heat transfer sheet 60 interposed between the detection face 31a of the overload protection device 30 and the upper face 10a of the casing 10. The heat transfer sheet 60 is made of a material with good thermal conductivity for transferring heat from the surface of the casing 10 to the detection face 31a of the overload protection device 30. In the present embodiment, the heat transfer sheet 60 is made of a flexible material for ensuring adhesion between the detection face 31a of the overload protection device 30 and the upper face 10a of the casing 10. The heat transfer sheet 60 is an example of a spacer member according to the present disclosure.

Figure 3:
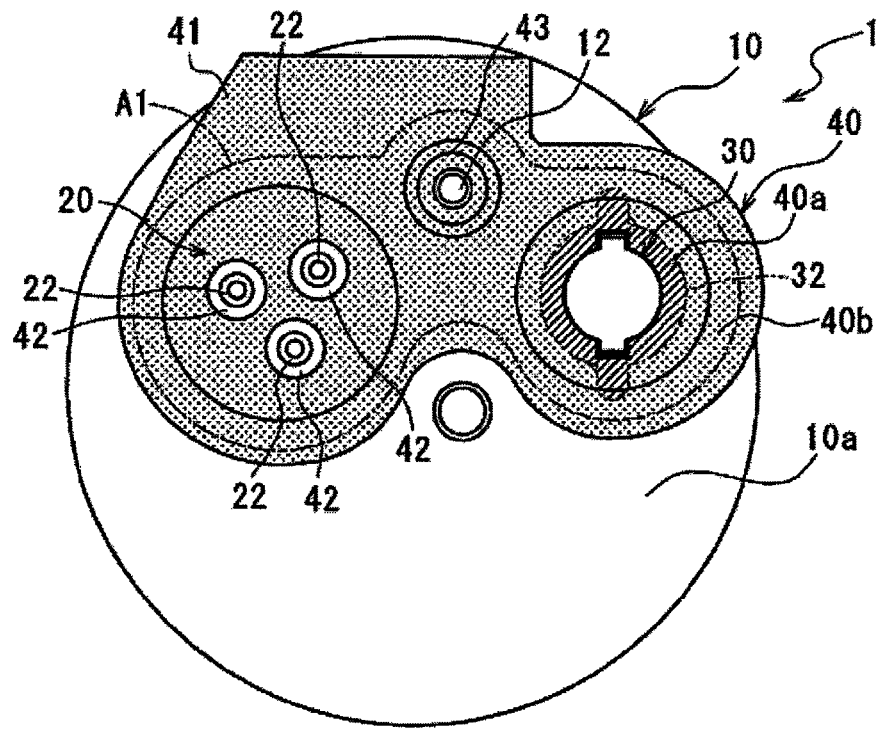
FIG. 3 is a plan view of the compressor according to the first embodiment.

FIG. 3 is a plan view of the compressor 1 according to the present embodiment. FIG. 3 does not illustrate the terminal cover 50. In FIG. 3, constituent elements identical with those illustrated in FIGS. 1 and 2 are denoted with reference signs identical with those in FIGS. 1 and 2.

With reference to FIG. 3, the gasket 40 includes a first portion 40a (a hatched portion in FIG. 3) overlapping the overload protection device 30 and a second portion 40b (a dotted portion in FIG. 3) not overlapping the overload protection device 30 as seen in plan view. The second portion 40b of the elastic member (gasket 40) includes a portion that extends toward the casing 10 from an intermediate position 53 of the first portion 40a with respect to a direction in which the mounting hole 44 extends, and the first portion 40a defines a projection 45 protruding from the second portion 40b at the intermediate position 53 of the first portion 40a toward the casing 10, as shown in FIGS. 1-7.

The first portion 40a of the gasket 40 overlaps the rib 32 of the overload protection device 30 as seen in plan view. The first portion 40a of the gasket 40 includes the projection 45 and tubular portion 46 (see FIG. 1) of the gasket 40. In the present embodiment, the second portion 40b of the gasket 40 includes the gasket main body 41.

In the gasket 40, the second portion 40b is pressed against the upper face 10a of the casing 10 by the terminal cover 50 (see FIG. 1) with the terminal cover 50 (see FIG. 1) fixed to the casing 10. Specifically, as illustrated in FIG. 3, the second portion 40b of the gasket 40 includes a portion A1 (indicated by a chain double-dashed line) surrounding the terminal unit 20, the overload protection device 30, and the stud 12. The portion A1 is pressed against the upper face 10a of the casing 10 by the terminal cover 50. In other words, the gasket main body 41 of the gasket 40 is pressed against the upper face 10a of the casing 10 by the terminal cover 50.

Figure 4:
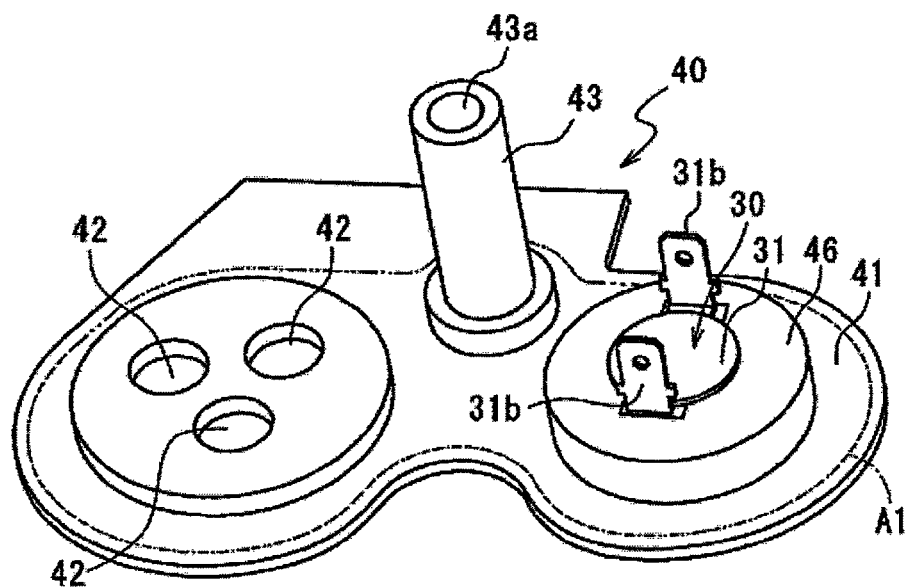
FIG. 4 is a perspective view of an overload protection device and a rubber sheet according to the first embodiment as seen from diagonally above.
Figure 5:
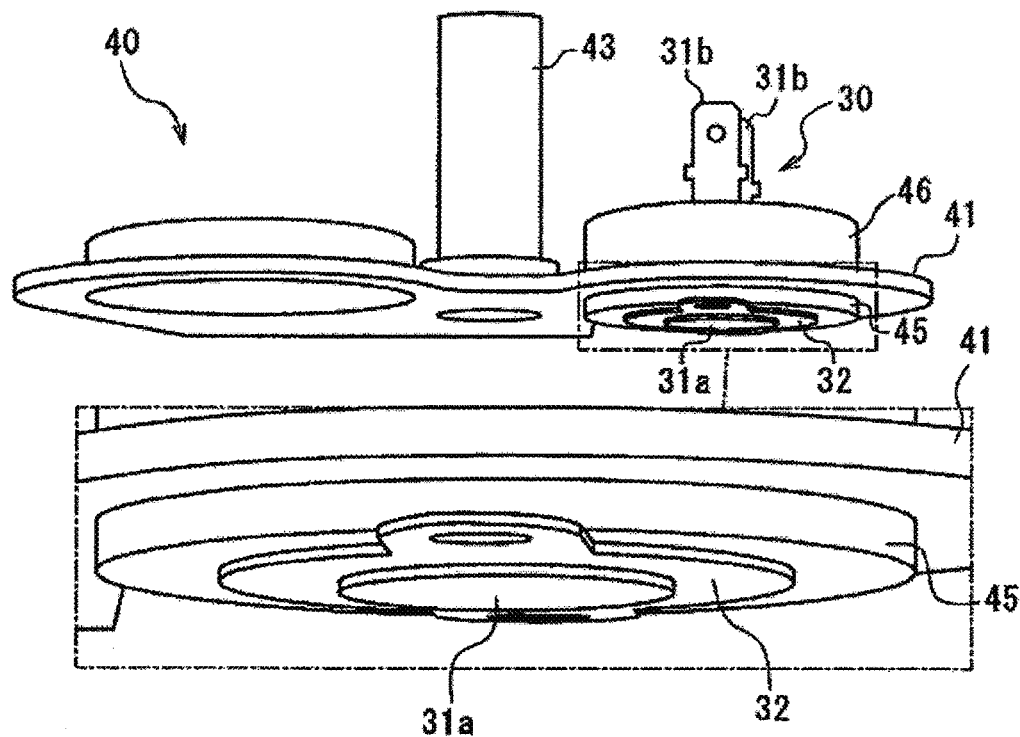
FIG. 5 is a perspective view of the overload protection device and the rubber sheet according to the first embodiment as seen from diagonally below.

FIG. 4 is a perspective view of the overload protection device 30 and the gasket 40 according to the present embodiment as seen from diagonally above. FIG. 5 is a perspective view of the overload protection device 30 and the gasket 40 according to the present embodiment as seen from diagonally below. FIGS. 4 and 5 each illustrate a state in which the terminal cover 50 is not fixed to the casing 10. In FIGS. 4 and 5, constituent elements identical with those illustrated in FIGS. 1 to 3 are denoted with reference signs identical with those in FIGS. 1 to 3.

With reference to FIG. 4, the gasket main body 41 of the gasket 40 has a flat sheet shape in the state in which the terminal cover 50 (see FIG. 1) is not fixed to the casing 10 (see FIG. 1). The tubular portion 46 of the gasket 40 has a cylindrical shape, and is disposed upright on the gasket main body 41 so as to cover the entire side face of the overload protection device 30. In the gasket 40, as described above, the portion A1 (indicated by the chain double-dashed line) of the second portion 40b (see FIG. 3) is pressed against the upper face 10a of the casing 10 by the terminal cover 50 fixed to the casing 10.

With reference to FIG. 5, in the present embodiment, the projection 45 of the gasket 40 is disposed closer to the casing 10 (see FIG. 1) than the gasket main body 41 is, and has a cylindrical shape so as to cover the entire circumference of a part of the side face of the overload protection device 30.

As clearly illustrated in FIG. 5, the projection 45 of the gasket 40 protrudes from the gasket main body 41 toward one side (downward in FIG. 5). The rib 32 of the overload protection device 30 is more to the one side than the projection 45 of the gasket 40 (i.e., the rib 32 of the overload protection device 30 is located lower than the projection 45 of the gasket 40 in FIG. 5). The detection face 31a of the overload protection device 30 is more to the one side than the rib 32 of the overload protection device 30 (i.e., the detection face 31a of the overload protection device 30 is located lower than the rib 32 of the overload protection device 30 in FIG. 5).

(Structure for Mounting Overload Protection Device 30)

Figure 6:
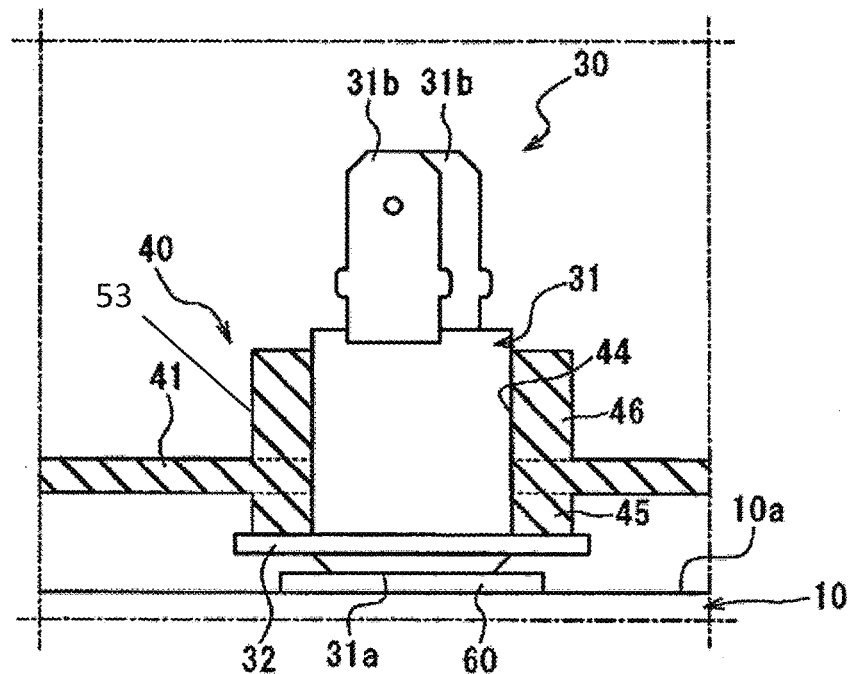
FIG. 6 is a longitudinal sectional view of a state before the overload protection device according to the first embodiment is mounted.
Figure 7:
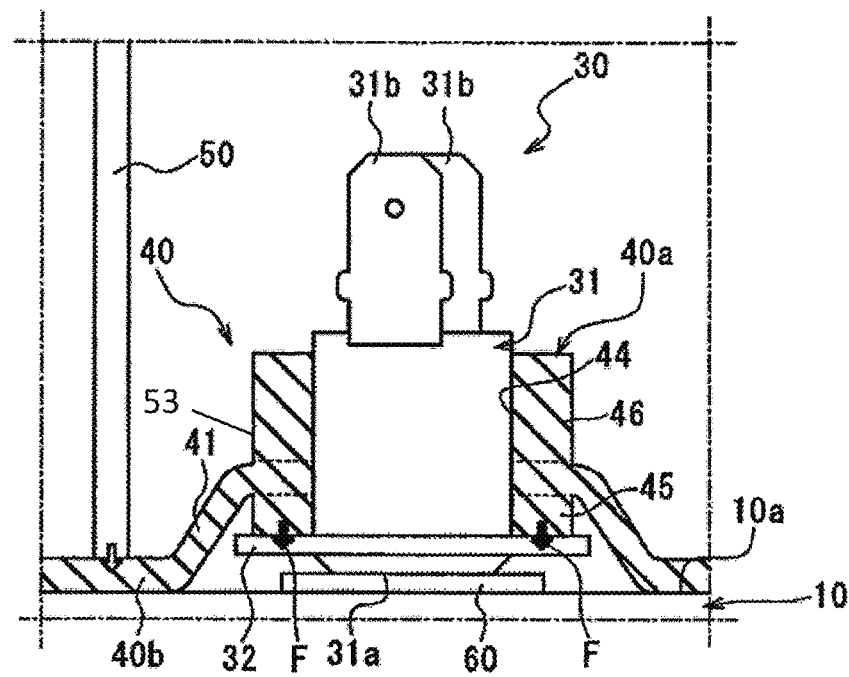
FIG. 7 is a longitudinal sectional view of a state in which the overload protection device according to the first embodiment is mounted.

FIG. 6 is a schematic longitudinal sectional view of the overload protection device 30 and its surroundings in the state in which the terminal cover 50 is not fixed to the casing 10. FIG. 7 is a schematic longitudinal sectional view of the overload protection device 30 and its surroundings in the state in which the terminal cover 50 is fixed to the casing 10.

As illustrated in FIG. 6, the rib 32 of the overload protection device 30 supports the projection 45 of the gasket 40 with the terminal cover 50 not fixed to the casing 10. The gasket main body 41 of the gasket 40 is thus separated from the upper face 10a of the casing 10 in the vicinity of the overload protection device 30. The gasket main body 41 of the gasket 40 is separated from the upper face 10a of the casing 10 by the length of the projection 45 by which the projection 45 protrudes from the gasket main body 41, the thickness of the rib 32, the length of the detection face 31a by which the detection face 31a protrudes from the rib 32, and the thickness of the heat transfer sheet 60.

As illustrated in FIG. 7, the terminal cover 50 presses the gasket main body 41 of the gasket 40 against the upper face 10a of the casing 10 (see a white arrow in the figure) with the terminal cover 50 fixed to the casing 10. At this time, the rib 32 of the overload protection device 30 restricts a movement of the projection 45 of the gasket 40 toward the casing 10. Therefore, the gasket 40 elastically deforms toward the casing 10 in a ring-shaped region around the overload protection device 30. As a result, the gasket 40 generates a reaction force F to return to its original shape, and this reaction force F from the projection 45 acts on the rib 32 of the overload protection device 30 (see black arrows in the figure). The overload protection device 30 is thus biased toward the casing 10 by this reaction force F. In other words, the terminal cover 50 presses the gasket 40 against the casing 10 such that the overload protection device 30 is biased toward the casing 10 by the reaction force.

According to the foregoing embodiment, the overload protection device 30 is biased toward the casing 10 by the reaction force F of the gasket 40. This allows adhesion between the detection face 31a of the overload protection device 30 and the outer peripheral face of the compressor 1 to be inhibited from lowering.

According to the foregoing embodiment, the projection 45 secures a spacing between the part around the peripheral edge of the mounting hole 44 and the casing 10. This allows an amount of deformation of the gasket 40 pressed against the casing 10 by the terminal cover 50 to be increased, as compared with a case where the gasket 40 includes no projection 45. As a result, the reaction force F acting on the overload protection device 30 becomes larger than a reaction force in the case where the gasket 40 includes no projection 45. This effectively inhibits lowering of adhesion between the detection face 31a of the overload protection device 30 and the upper face 10a of the compressor 1.

In addition, the gasket 40 includes the mounting hole 44 into which the overload protection device 30 is inserted. This configuration avoids a misalignment of the overload protection device 30 relative to the casing 10.

According to the foregoing embodiment, the rib 32 supports the first portion 40a of the gasket 40. This inhibits a displacement of the gasket 40 toward the casing 10 and a resulting decrease in amount of deformation of the gasket 40. This allows the reaction force F acting on the overload protection device 30 to be inhibited from lowering.

According to the foregoing embodiment, the tubular portion 46 covers the outer peripheral face of the overload protection device 30. This configuration avoids contact of the overload protection device 30 with peripheral components and the like, to thereby protect the overload protection device 30.

In the present embodiment, the gasket 40 is made of an insulating material, and therefore protects by insulation the overload protection device 30.

According to the foregoing embodiment, the heat transfer sheet 60 interposed between the detection face 31a of the overload protection device 30 and the outer peripheral face of the casing 10 secures the spacing between the part around the peripheral edge of the mounting hole 44 and the casing 10. Therefore, an amount of deformation of the gasket 40 is increased, as compared with a case where the compressor 1 includes no heat transfer sheet 60. As a result, the reaction force F acting on the overload protection device 30 becomes larger than a reaction force in the case where the compressor 1 includes no heat transfer sheet 60. Therefore, lowering of adhesion between the detection face 31a of the overload protection device 30 and the upper face 10a of the compressor 1 is effectively inhibited.

According to the foregoing embodiment, the gasket 40 has a function of sealing the interface between the terminal cover 50 and the casing 10 and a function of biasing the overload protection device 30 toward the casing 10. This eliminates a necessity of other members for inhibiting lowering of adhesion between the overload protection device 30 and the casing 10, and inhibits an increase in parts count to thereby simplify a structure for mounting the overload protection device 30 to the casing 10.

Second Embodiment

A compressor 1 according to a second embodiment is similar in configuration to the compressor 1 according to the first embodiment except for a structure for mounting an overload protection device 130. Specifically, the compressor 1 according to the second embodiment is similar in configuration to the compressor 1 according to the first embodiment except for a configuration of an overload protection device 130 and a configuration of a gasket 140. Constituent elements similar to those described in the first embodiment are denoted with the identical reference signs; therefore, the detailed description thereof will not be given here.

Figure 8:
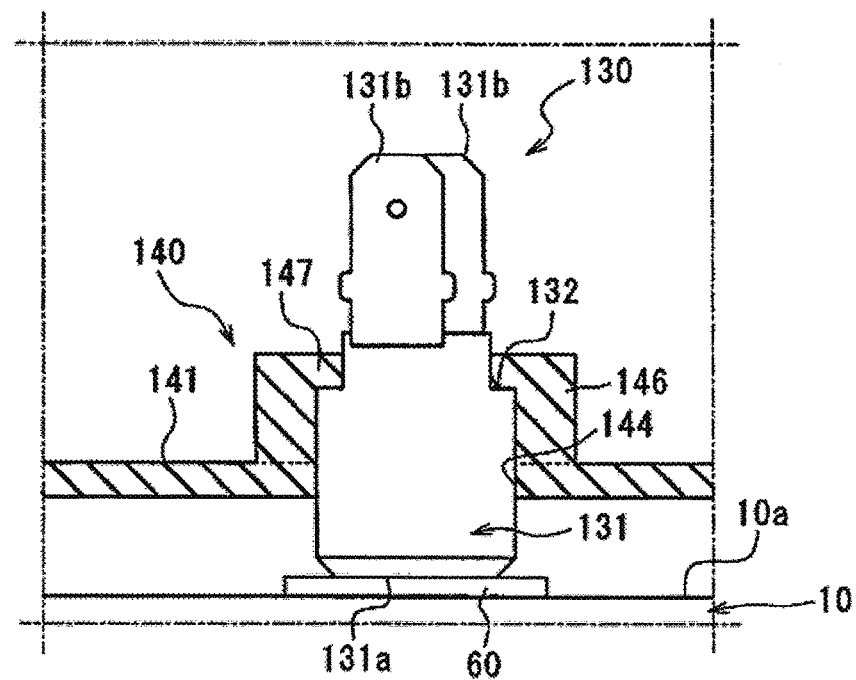
FIG. 8 is a longitudinal sectional view of a state before an overload protection device according to a second embodiment is mounted.
Figure 9:
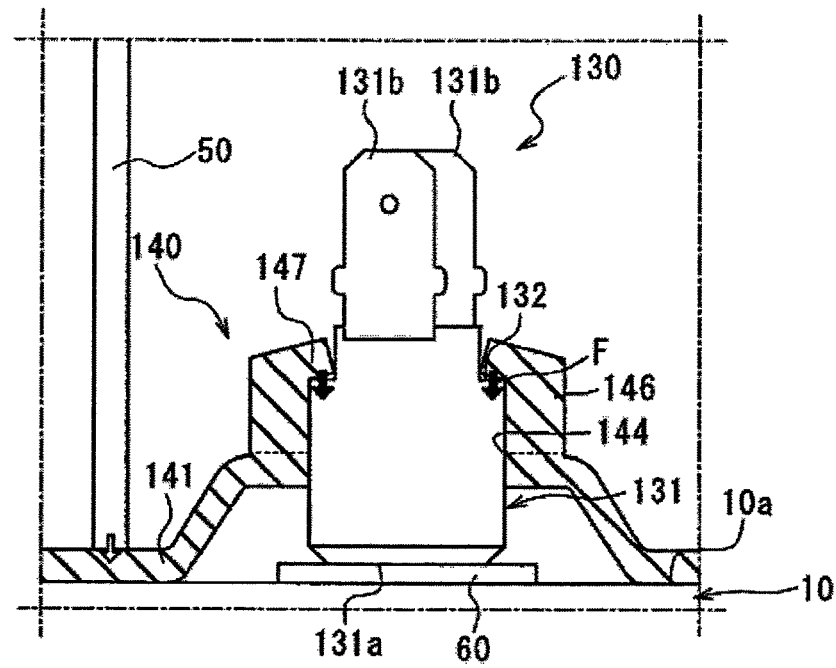
FIG. 9 is a longitudinal sectional view of a state in which the overload protection device according to the second embodiment is mounted.

FIG. 8 is a schematic longitudinal sectional view of the overload protection device 130 and its surroundings in a state in which a terminal cover 50 is not fixed to a casing 10 in the present embodiment. FIG. 9 is a schematic longitudinal sectional view of the overload protection device 130 and its surroundings in a state in which the terminal cover 50 is fixed to the casing 10.

With reference to FIGS. 8 and 9, the overload protection device 130 includes an overload protection device main body 131 and a step 132 disposed on an outer peripheral face of the overload protection device main body 131. The overload protection device main body 131 is an example of a detection device main body according to the present disclosure.

The overload protection device main body 131 has, on one of end faces (a lower end face in FIGS. 8 and 9), a detection face 131a for detecting an internal state of the casing 10. The overload protection device main body 131 also has, on the other end face (an upper end face in FIGS. 8 and 9), a tab terminal 131b connected to a control board (not illustrated) via a wire (not illustrated). The overload protection device 130 is placed such that the detection face 131a is located opposite an upper face 10a of the casing 10.

The step 132 recedes from the end face, where the tab terminal 131b is disposed, toward the casing 10. The step 132 is formed at an outer peripheral edge of the end face where the tab terminal 131b is disposed.

In the present embodiment, the gasket 140 includes a gasket main body 141 having a sheet shape, and a mounting hole 144 for mounting the overload protection device 130. The mounting hole 144 in the gasket 140 is slightly smaller than an outside diameter of the overload protection device 130. The gasket 140 according to the second embodiment is similar in configuration to that described in the first embodiment except for a portion around the periphery of the mounting hole 144. Specifically, although not illustrated in the drawings, the gasket 140 according to the second embodiment includes, for example, pin terminal insertion holes, a tubular portion into which a stud is inserted, and a stud insertion hole defined by an inner peripheral face of the tubular portion, as in the first embodiment.

The gasket 140 includes a tubular portion 146 disposed upright around the mounting hole 144, and a protrusion 147 extending from a distal end of the tubular portion 146 toward the inside of the tubular portion 146 along the step 132 of the overload protection device 130.

Figure 10:
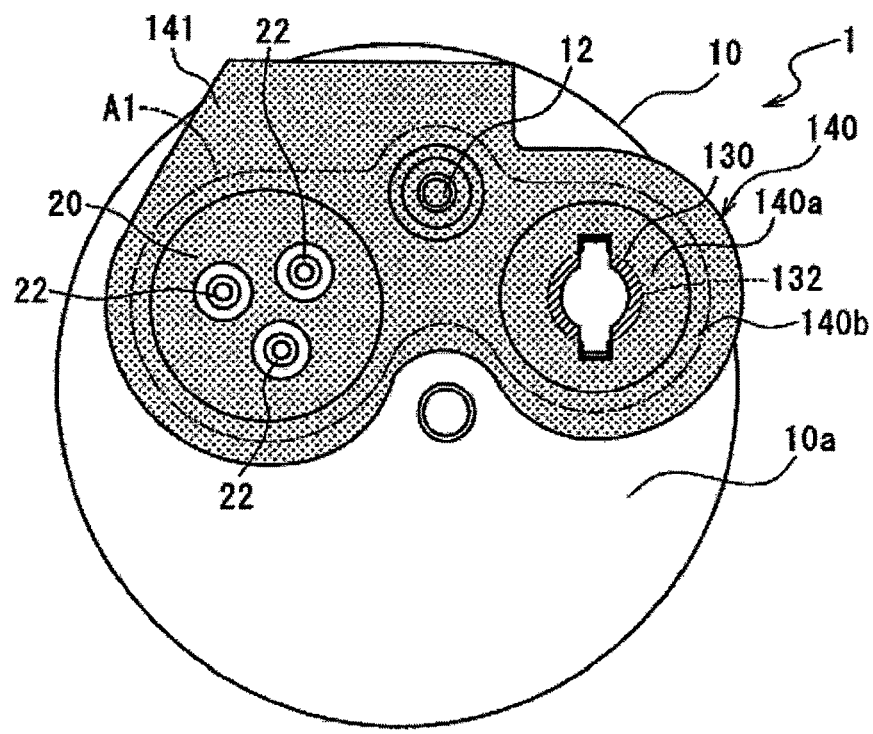
FIG. 10 is a plan view of a compressor according to the second embodiment.

FIG. 10 is a plan view of the compressor 1 according to the present embodiment. FIG. 10 does not illustrate the terminal cover 50. In FIG. 10, constituent elements similar to those illustrated in FIGS. 8 and 9 are denoted with reference signs identical with those in FIGS. 8 and 9.

With reference to FIG. 10, the gasket 140 includes a first portion 140a (a hatched portion in FIG. 10) overlapping the overload protection device 130 and a second portion 140b (a dotted portion in FIG. 10) not overlapping the overload protection device 130 as seen in plan view.

The first portion 140a of the gasket 140 overlaps the step 132 of the overload protection device 130 as seen in plan view. The first portion 140a of the gasket 140 includes the protrusion 147. The second portion 140b of the gasket 140 includes the gasket main body 141.

In the gasket 140, the second portion 140b is pressed against the upper face 10a of the casing 10 by the terminal cover 50 when the terminal cover 50 is fixed to the casing 10. Specifically, as illustrated in FIG. 10, the second portion 140b of the gasket 140 includes a portion A1 (indicated by a chain double-dashed line) surrounding the terminal unit 20, the overload protection device 30, and the stud 12. The portion A1 is pressed against the upper face 10a of the casing 10 by the terminal cover 50.

As illustrated in FIG. 8, the step 132 of the overload protection device 130 supports the protrusion 147 of the gasket 140 with the terminal cover 50 not fixed to the casing 10. The gasket main body 141 of the gasket 140 is thus separated from the upper face 10a of the casing 10 in the vicinity of the overload protection device 130. In other words, the overload protection device main body 131 protrudes from the gasket main body 141 of the gasket 140 toward the casing 10.

As illustrated in FIG. 9, the terminal cover 50 presses the gasket main body 141 of the gasket 140 against the upper face 10a of the casing 10 (see a white arrow in the figure) when the terminal cover 50 is fixed to the casing 10. At this time, the step 132 of the overload protection device 130 restricts a movement of the protrusion 147 of the gasket 140 toward the casing 10. Therefore, the gasket 140 elastically deforms toward the casing 10 in a ring-shaped region around the overload protection device 130. As a result, the gasket 140 generates a reaction force F to return to its original shape, and this reaction force F from the protrusion 147 of the gasket 140 acts on the step 132 of the overload protection device 130 (see black arrows in the figure). The overload protection device 130 is thus biased toward the casing 10 by this reaction force F. In other words, the terminal cover 50 presses the gasket 140 against the casing 10 such that the overload protection device 130 is biased toward the casing 10 by the reaction force F.

The second embodiment produces functional effects similar to those of the first embodiment.

In addition, the step 132 recedes from the end face, where the tab terminal 131b is disposed, toward the casing 10. Therefore, the protrusion 147 of the gasket 140 never hinders work for connecting the tab terminals 131b to the wire (not illustrated). This configuration thus inhibits degradation in workability in connecting the tab terminal 131b to the wire (not illustrated).

Figure 11:
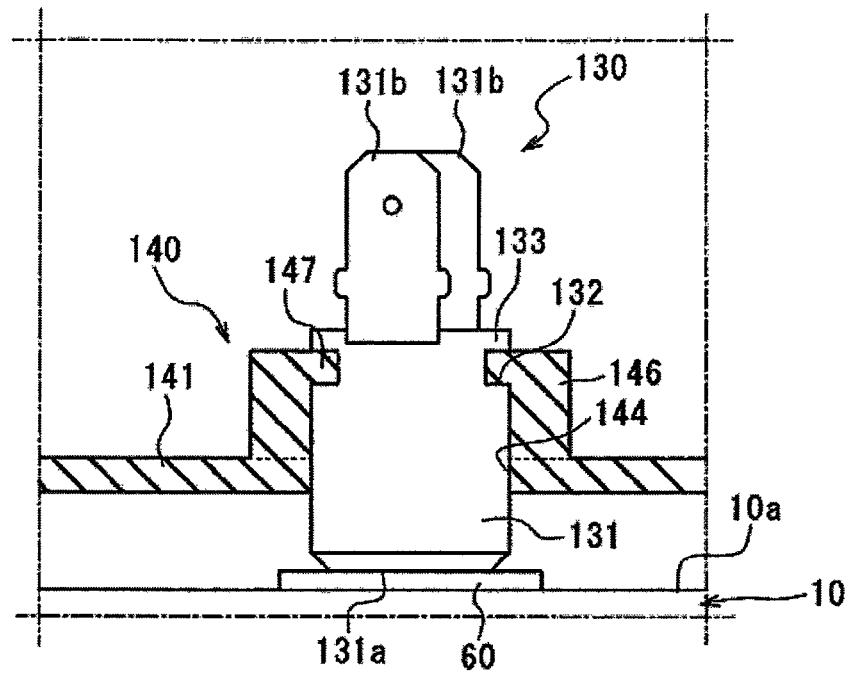
FIG. 11 is a longitudinal sectional view of a state before an overload protection device according to a modification of the second embodiment is mounted.
Figure 12:
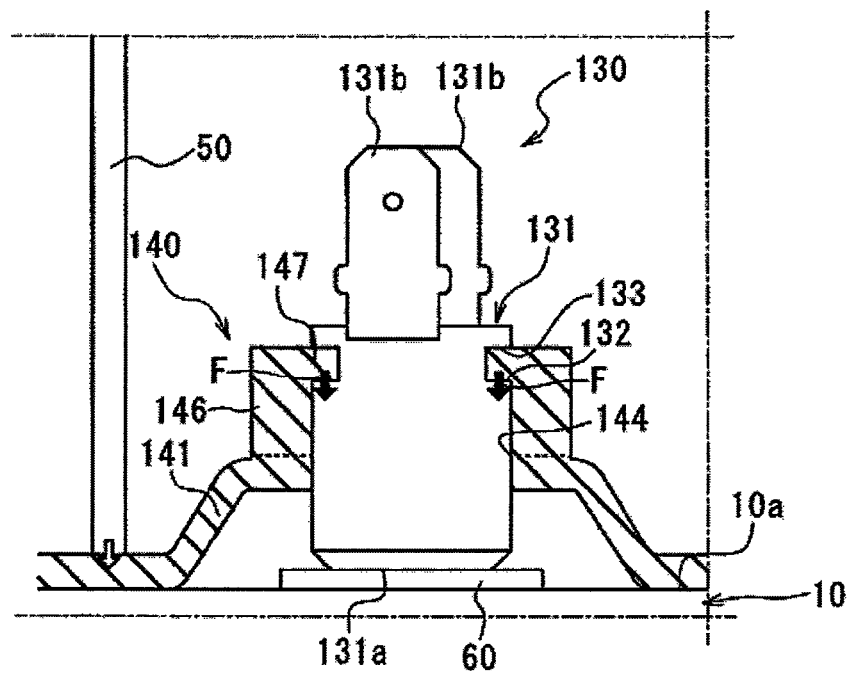
FIG. 12 is a longitudinal sectional view of a state in which the overload protection device according to the modification of the second embodiment is mounted.

FIG. 11 is a schematic longitudinal sectional view of the overload protection device 130 and its surroundings in the state in which the terminal cover 50 is not fixed to the casing 10 in a modification of the second embodiment. FIG. 12 is a schematic longitudinal sectional view of the overload protection device 130 and its surroundings in the state in which the terminal cover 50 is fixed to the casing 10 in the modification of the second embodiment.

With reference to FIGS. 11 and 12, the step 132 is formed by a side face of the overload protection device main body 131 receding toward an inside of the overload protection device main body 131. In this modification, the overload protection device 130 has an upper wall 133 located opposite the step 132. The protrusion 147 of the gasket 140 is fitted to a groove-shaped recess defined by the step 132 and upper wall 133 of the overload protection device 130.

As illustrated in FIG. 12, the step 132 in this modification is defined by the recess in the side face of the overload protection device main body 131. Therefore, the upper wall 133 restricts warpage of the protrusion 147 of the gasket 140 in the direction opposite to the casing 10 when the terminal cover 50 is fixed to the casing 10. This inhibits disengagement of the protrusion 147 of the gasket 140 from the step 132 of the overload protection device 130.

Third Embodiment

A compressor 1 according to a third embodiment is similar in configuration to the compressor 1 according to the first embodiment except for a shape of a tubular portion 243 of a gasket 240. Constituent elements similar to those described in the first embodiment are denoted with the identical reference signs; therefore, the detailed description thereof will not be given here.

Figure 13:
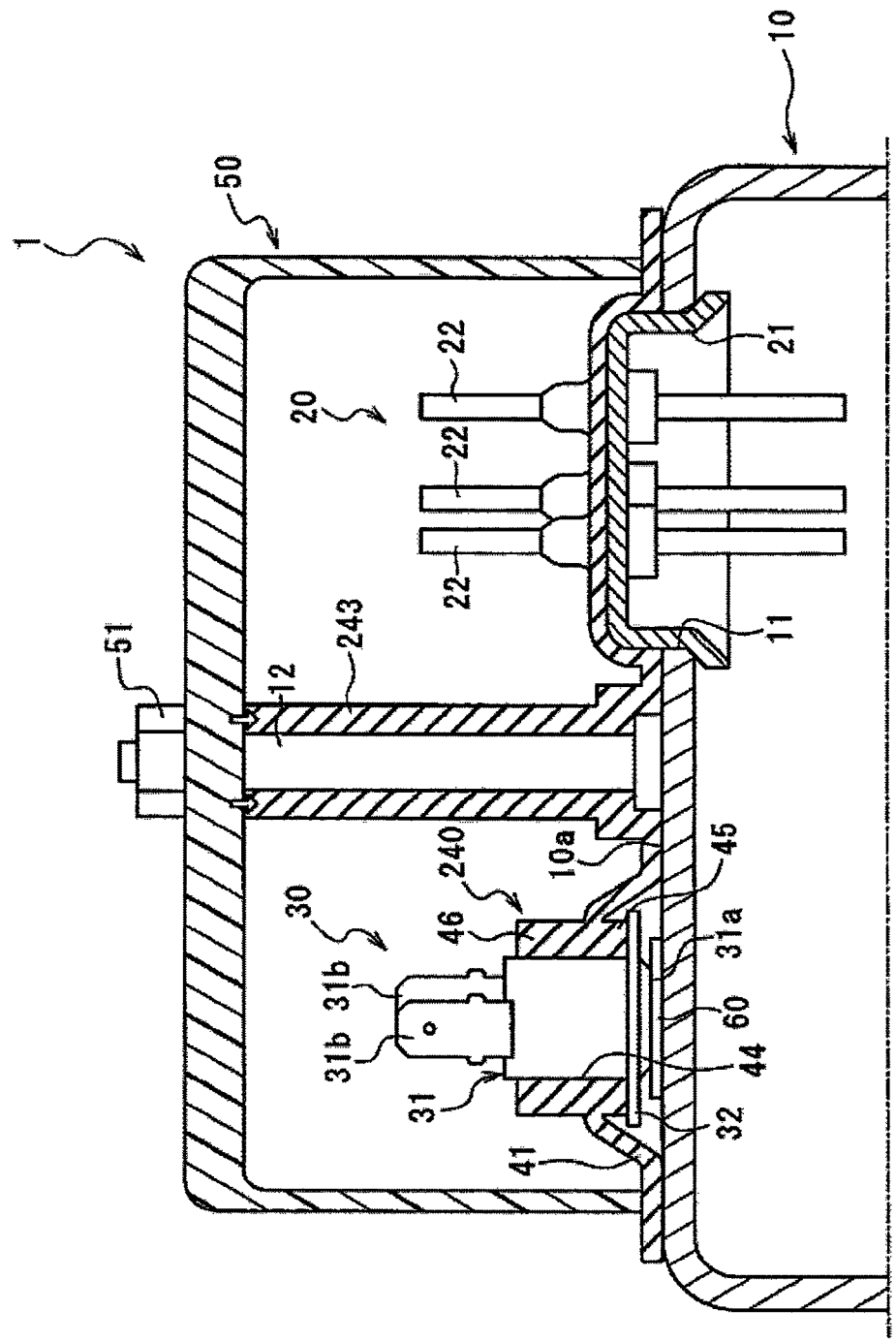
FIG. 13 is a schematic longitudinal sectional view of an upper portion of a compressor according to a third embodiment.
Figure 14:
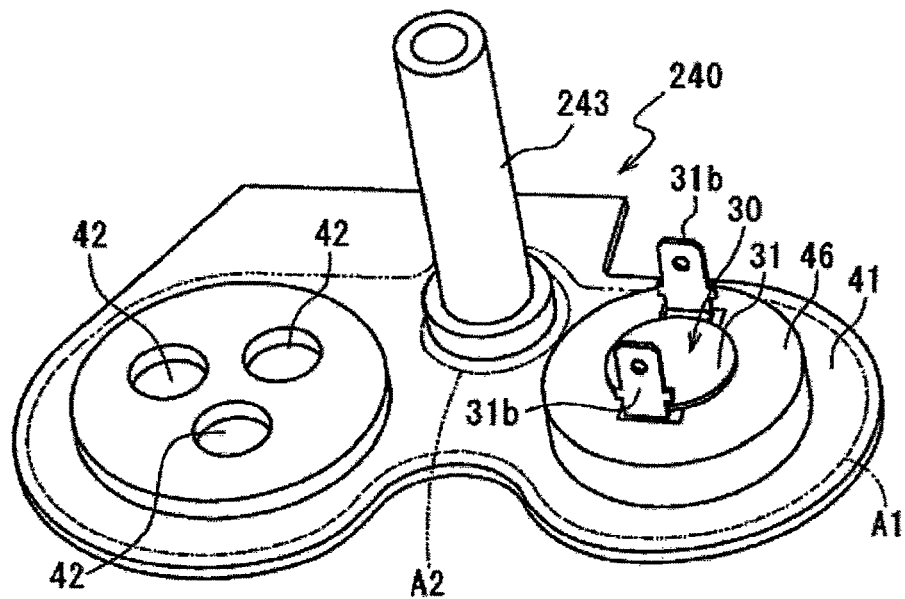
FIG. 14 is a perspective view of an overload protection device and a rubber sheet according to the third embodiment as seen from above.

FIG. 13 is a longitudinal sectional view of an upper portion of the compressor 1 according to the present embodiment. FIG. 14 is a perspective view of an overload protection device 30 and the gasket 240 according to the present embodiment as seen from diagonally above.

With reference to FIGS. 13 and 14, in the present embodiment, the gasket 240 includes the tubular portion 243 longer than a distance between an upper face 10a of a casing 10 and an upper wall 50a of a terminal cover 50. In the present embodiment, with the terminal cover 50 fixed to the casing 10, the terminal cover 50 presses the tubular portion 243 of the gasket 240 against the casing 10 (see white arrows in FIG. 13).

The third embodiment produces functional effects similar to those of the first embodiment.

The terminal cover 50 presses the tubular portion 243 of the gasket 240 against the casing 10 when the terminal cover 50 is fixed to the casing 10. Therefore, a portion A1 of the gasket 240 and a peripheral portion A2 (see FIG. 14) of the tubular portion 243 are pressed against the upper face 10a of the casing 10 when the terminal cover 50 is fixed to the casing 10, as illustrated in FIG. 13. This results in an increase of a region where the gasket 240 is pressed against the casing 10, as compared with a case where the gasket 240 does not include the tubular portion 243. Therefore, lowering of adhesion of the gasket 240 is inhibited.

Fourth Embodiment

A compressor 1 according to a fourth embodiment is similar in configuration to the compressor 1 according to the first embodiment except for a shape of a rib 332 and that a gasket 40 includes no projection. Constituent elements similar to those described in the first embodiment are denoted with the identical reference signs; therefore, the detailed description thereof will not be given here.

Figure 15:
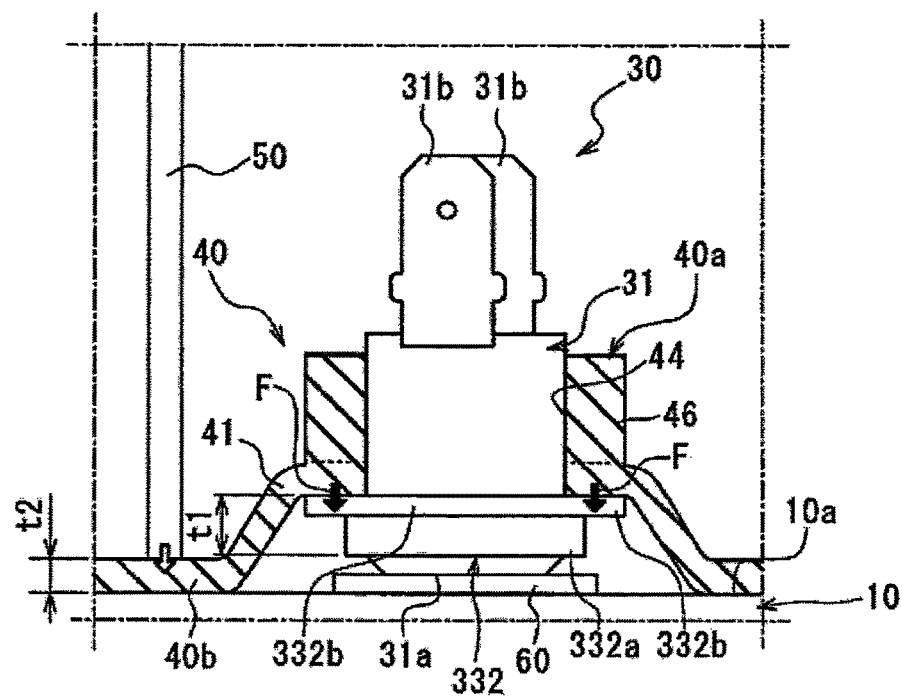
FIG. 15 is a longitudinal sectional view of a state in which an overload protection device according to a fourth embodiment is mounted.

FIG. 15 is a schematic longitudinal sectional view of an overload protection device 30 and its surroundings in a state in which a terminal cover 50 is fixed to a casing 10 in the present embodiment.

With reference to FIG. 15, in the present embodiment, the rib 332 includes a base 332a having a tubular shape and surrounding an outer peripheral face of an overload protection device main body 31, and a flange 332b having a disk shape and extending outward from one of ends (an end closer to a first portion 40a of the gasket 40) of the base 332a. The rib 332 is mounted for avoiding a displacement of the overload protection device main body 31 toward the casing 10. The rib 332 in the present embodiment is an example of a support according to the present invention.

In the state illustrated in FIG. 15, the flange 332b in the present embodiment supports the first portion 40a of the gasket 40.

In the present embodiment, the rib 332 has a thickness (a length from an end, closer to the casing 10, of the rib 332 to an end, opposite to the casing 10, of the rib 332) t1 larger than a thickness t2 of a second portion 40b of the gasket 40.

Although not illustrated in the drawings, in the present embodiment, the first portion 40a of the gasket 40 overlaps the rib 332 of the overload protection device 30 as seen in plan view. Specifically, in the present embodiment, the first portion 40a of the gasket 40 overlaps the flange 332b of the rib 332 as seen in plan view.

As illustrated in FIG. 15, the terminal cover 50, when fixed to the casing 10, presses a gasket main body 41 of the gasket 40 against an upper face 10a of the casing 10 (see a white arrow in the figure). At this time, the flange 332b of the rib 332 of the overload protection device 30 restricts a movement of the gasket 40 toward the casing 10. Therefore, the gasket 40 elastically deforms toward the casing 10 in a ring-shaped region around the overload protection device 30. As a result, the gasket 40 generates a reaction force F to return to its original shape, and this reaction force F from the gasket 40 acts on the flange 332b of the rib 332 of the overload protection device 30 (see black arrows in the figure). The overload protection device 30 is thus biased toward the casing 10 by this reaction force F. In other words, the terminal cover 50 presses the gasket 40 against the casing 10 such that the overload protection device 30 is biased toward the casing 10 by the reaction force F.

The fourth embodiment produces functional effects similar to those of the first embodiment.

The base 332a of the rib 332 ensures a spacing between the casing 10 and the first portion 40a of the gasket 40 supported by the flange 332b of the rib 332. This increases an amount of deformation of the gasket 40 when the second portion 40b of the gasket 40 is pressed against the casing 10, as compared with a case where the rib 332 includes no base 332a. As a result, the reaction force F which the gasket 40 applies to the overload protection device 30 becomes larger than a reaction force in the case where the rib 332 includes no base 332a. This effectively inhibits lowering of adhesion between the detection face 31a of the overload protection device 30 and the upper face 10a of the casing 10.

In addition, the thickness t1 of the rib 332 is larger than the thickness t2 of the second portion 40b of the gasket 40. This increases a spacing between the casing 10 and the first portion 40a of the gasket 40, as compared with a case where the thickness t1 of the rib 332 is smaller than the thickness t2 of the second portion 40b of the gasket 40. This in turn increases an amount of deformation of the gasket 40 when the gasket 40 is pressed against the casing 10 by the terminal cover 50, as compared with the case where the thickness t1 of the rib 332 is smaller than the thickness t2 of the second portion 40b of the gasket 40. As a result, the reaction force F acting on the overload protection device 30 becomes larger than a reaction force in the case where the thickness t1 of the rib 332 is smaller than the thickness t2 of the second portion 40b of the gasket 40. Therefore, lowering of adhesion between the detection face 31a of the overload protection device 30 and the upper face 10a of the compressor 1 is effectively inhibited.

Fifth Embodiment

A compressor 1 according to a fifth embodiment is similar in configuration to the compressor 1 according to the first embodiment except for a shape of a rib 432 and that a gasket 40 includes no projection. Constituent elements similar to those described in the first embodiment are denoted with the identical reference signs; therefore, the detailed description thereof will not be given here.

Figure 16:
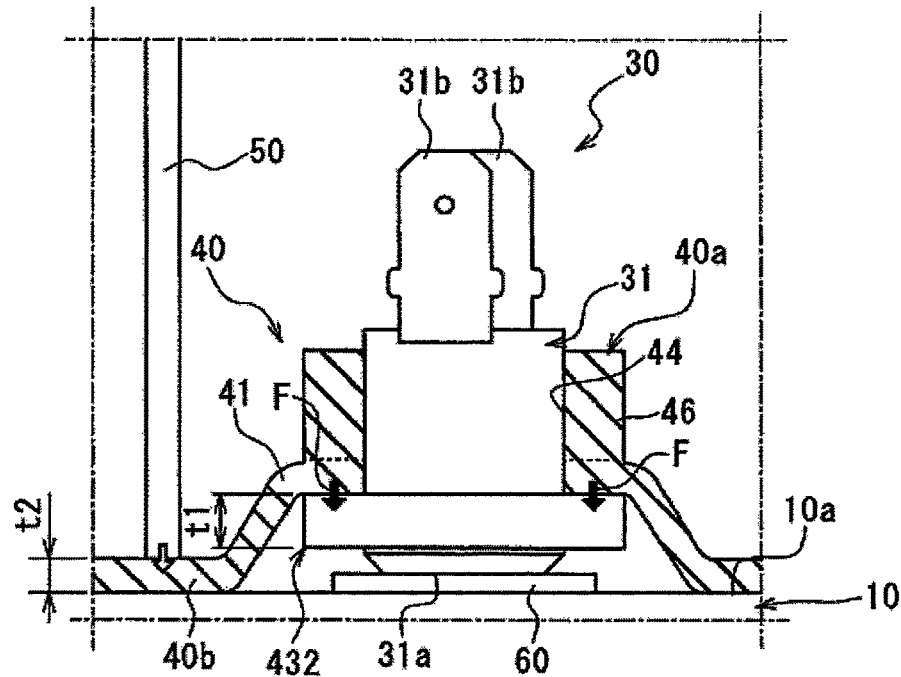
FIG. 16 is a longitudinal sectional view of a state in which an overload protection device according to a fifth embodiment is mounted.

FIG. 16 is a schematic longitudinal sectional view of an overload protection device 30 and its surroundings in a state in which a terminal cover 50 is fixed to a casing 10 in the fifth embodiment.

With reference to FIG. 16, in the present embodiment, the rib 432 has a thickness t1 larger than a thickness t2 of a second portion 40b of the gasket 40. The rib 432 in the present embodiment is an example of a support according to the present invention.

Although not illustrated in the drawings, in the present embodiment, the gasket 40 has a first portion 40a overlapping the rib 432 of the overload protection device 30 as seen in plan view.

As illustrated in FIG. 16, the terminal cover 50, fixed to the casing 10, presses a gasket main body 41 of the gasket 40 against an upper face 10a of the casing 10 (see a white arrow in the figure). At this time, the rib 432 of the overload protection device 30 restricts a movement of the gasket 40 toward the casing 10. Therefore, the gasket 40 elastically deforms toward the casing 10 in a ring-shaped region around the terminal cover 50 and the overload protection device 30. As a result, the gasket 40 generates a reaction force F to return to its original shape, and this reaction force F from the gasket 40 acts on the rib 432 of the overload protection device 30 (see black arrows in the figure). The overload protection device 30 is thus biased toward the casing 10 by this reaction force F. In other words, the terminal cover 50 presses the gasket 40 against the casing 10 such that the overload protection device 30 is biased toward the casing 10 by the reaction force F.

The fifth embodiment produces functional effects similar to those of the first embodiment.

In addition, the thickness t1 of the rib 432 is larger than the thickness t2 of the second portion 40b of the gasket 40. This increases a spacing between the casing 10 and the first portion 40a of the gasket 40, as compared with a case where the thickness t1 of the rib 432 is smaller than the thickness t2 of the second portion 40b of the gasket 40. This in turn increases an amount of deformation of the gasket 40 when the gasket 40 is pressed against the casing 10 by the terminal cover 50, as compared with the case where the thickness t1 of the rib 432 is smaller than the thickness t2 of the second portion 40b of the gasket 40. As a result, the reaction force F acting on the overload protection device 30 becomes larger than a reaction force in the case where the thickness t1 of the rib 432 is smaller than the thickness t2 of the second portion 40b of the gasket 40. Therefore, lowering of adhesion between the detection face 31a of the overload protection device 30 and the upper face 10a of the compressor 1 is effectively inhibited.

Sixth Embodiment

A compressor 1 according to a sixth embodiment is similar in configuration to the compressor 1 according to the first embodiment except for a shape of a gasket 540 and that a detection device 30 includes no rib. The description thereof is therefore given with reference to FIGS. 1 and 2 in addition to FIGS. 17 and 18. In the sixth embodiment, constituent elements similar to those described in the first embodiment are denoted with the identical reference signs; therefore, the detailed description thereof will not be given here.

Figure 17:
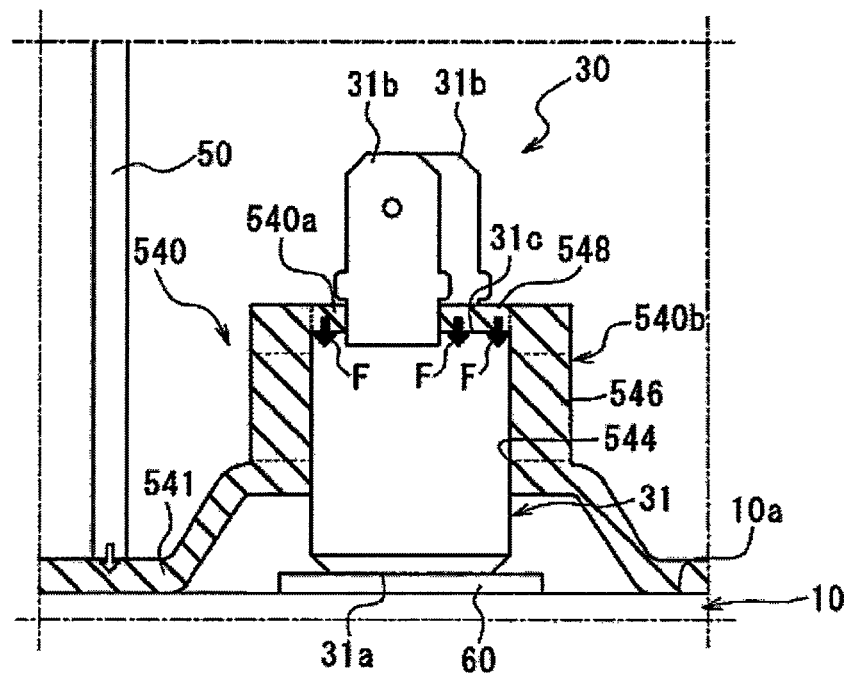
FIG. 17 is a longitudinal sectional view of a state in which an overload protection device according to a sixth embodiment is mounted.
Figure 18:
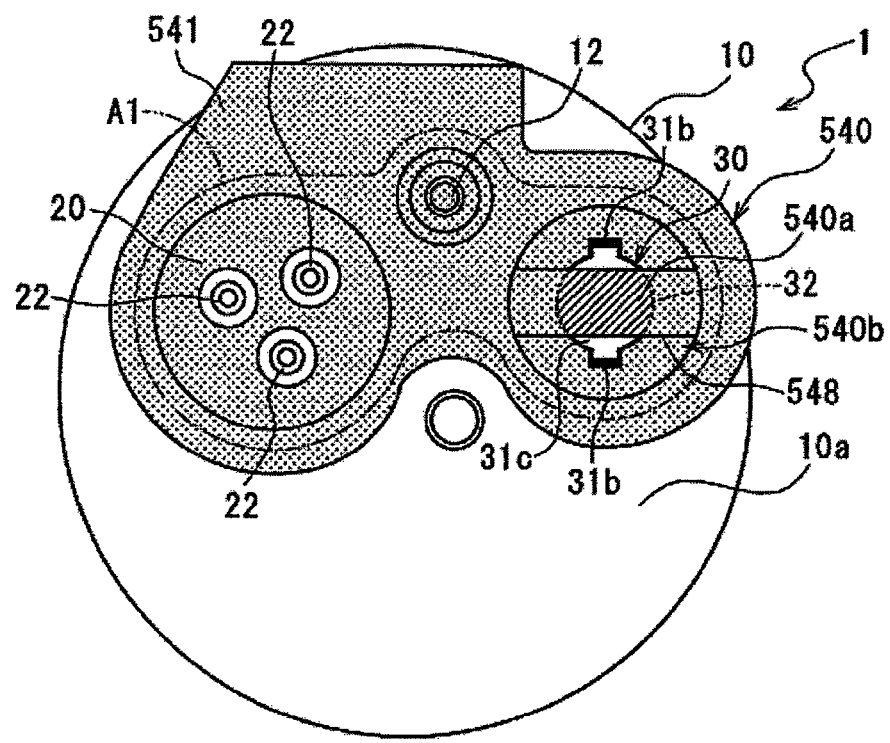
FIG. 18 is a plan view of a compressor according to the sixth embodiment.

FIG. 17 is a schematic longitudinal sectional view of the overload protection device 30 and its surroundings in a state in which a terminal cover 50 is fixed to a casing 10 in the sixth embodiment. FIG. 18 is a plan view of the compressor 1 according to the sixth embodiment. FIG. 18 does not illustrate the terminal cover 50.

With reference to FIGS. 17 and 18, in the present embodiment, a gasket 540 includes a gasket main body 541 having a sheet shape, and a mounting hole 544 for mounting the overload protection device 30. The mounting hole 544 in the gasket 540 is slightly smaller than an outside diameter of the overload protection device 30. The gasket 540 according to the sixth embodiment is similar in configuration to that described in the first embodiment except for a portion around the periphery of the mounting hole 544. Specifically, although not illustrated in the drawings, the gasket 540 according to the sixth embodiment includes, for example, pin terminal insertion holes, a tubular portion into which a stud is inserted, and a stud insertion hole defined by an inner peripheral face of the tubular portion, as in that described in the first embodiment.

The gasket 540 includes a tubular portion 546 disposed upright on a part around a peripheral edge of the mounting hole 544, and a bridge 548 disposed on an upper end of the tubular portion 546 so as to extend over an opening in the tubular portion 546.

In the present embodiment, the bridge 548 extends over an upper face 31c, where tab terminals 31b are disposed, of the overload protection device main body 31. As illustrated in FIG. 18, the bridge 548 is located between the tab terminals 31b and extends across the upper face 31c of the overload protection device main body 31.

As illustrated in FIG. 18, the gasket 540 includes a first portion 540a (a hatched portion in FIG. 18) overlapping the overload protection device 30 and a second portion 540b (a dotted portion in FIG. 18) not overlapping the overload protection device 30 as seen in plan view.

In the present embodiment, the first portion 540a of the gasket 540 is a portion overlapping the upper face 31c of the overload protection device main body 31 as seen in plan view. In other words, the first portion 540a of the gasket 540 in the present embodiment overlaps a part of the upper face 31c of the overload protection device main body 31 as seen in plan view. The first portion 540a of the gasket 540 includes a part of the bridge 548. The second portion 540b of the gasket 540 includes the gasket main body 541.

The second portion 540b of the gasket 540 is pressed against the upper face 10a of the casing 10 by the terminal cover 50 when the terminal cover 50 is fixed to the casing 10 as illustrated in FIG. 17. Specifically, as illustrated in FIG. 18, of the second portion 540b of the gasket 540, a portion A1 (indicated by a chain double-dashed line) surrounding a terminal unit 20, the overload protection device 30, and a stud 12 is pressed against the upper face 10a of the casing 10 by the terminal cover 50.

As illustrated in FIG. 17, the terminal cover 50, when fixed to the casing 10, presses a gasket main body 541 of the gasket 540 against the upper face 10a of the casing 10 (see a white arrow in the figure). At this time, the upper face 31c of the overload protection device 30 restricts a movement of the bridge 548 of the gasket 540 toward the casing 10. Therefore, the gasket 540 elastically deforms toward the casing 10 in a ring-shaped region around the overload protection device 30. As a result, the gasket 540 generates a reaction force F to return to its original shape, and this reaction force F from the bridge 548 of the gasket 540 acts on the upper face 31c of the overload protection device main body 31 (see black arrows in the figure). The overload protection device 30 is thus biased toward the casing 10 by this reaction force F. In other words, the terminal cover 50 presses the gasket 540 against the casing 10 such that the overload protection device 30 is biased toward the casing 10 by the reaction force F.

The sixth embodiment produces functional effects similar to those of the first embodiment.

In the present embodiment, the bridge 548 extends across the upper face 31c of the overload protection device main body 31, but does not necessarily extend across the upper face 31c of the overload protection device main body 31 as long as it overlaps at least a part of the upper face 31c of the overload protection device main body 31 as seen in plan view.

While various embodiments have been described herein above, it is to be appreciated that various changes in form and detail may be made without departing from the spirit and scope presently or hereafter claimed.

For example, in the first to sixth embodiments, the detection device is an overload protection device, but is not limited thereto. The detection device may be a simple temperature sensor or may be a vibration sensor. In a case where the detection device is a vibration sensor, the spacer member is not limited to a heat transfer sheet, and therefore does not necessarily have thermal conductivity.

What is claimed is:

1. A compressor comprising: a casing accommodating a compression mechanism; a detection device having a detection face configured to detect an internal state of the casing, the detection face being located opposite an outer peripheral face of the casing; an elastic member including a first portion overlapping the detection device and a second portion not overlapping the detection device, as seen in plan view; and a cover mounted to the casing to cover the detection device and a part of the elastic member, the cover being configured to press the second portion of the elastic member against the casing, with the first portion of the elastic member pressing the detection device against the casing, the elastic member including a mounting hole into which the detection device is inserted, the first portion of the elastic member being substantially tubular and surrounding the mounting hole, the second portion of the elastic member including a portion that extends toward the casing from an intermediate position of the first portion with respect to a direction in which the mounting hole extends, and the first portion defining a projection protruding from the intermediate position of the first portion toward the casing.

2. The compressor according to claim 1, wherein
the detection device includes
a detection device main body having the detection face, and
a support protruding from an outer peripheral face of the detection device main body,
the first portion of the elastic member overlaps the support of the detection device as seen in plan view, and
the detection device is pressed against the casing, with the first portion of the elastic member biasing the support of the detection device toward the casing.

3. The compressor according to claim 2, wherein
the support includes
a base having a tubular shape and covering the outer peripheral face of the detection device main body, and
a flange disposed on an end, closer to the first portion, of the base.

4. The compressor according to claim 2, wherein
the support has a thickness larger than a thickness of the second portion of the elastic member.

5. The compressor according to claim 1, wherein
the detection device includes
a detection device main body having the detection face, and
a step disposed on an outer peripheral face of the detection device main body,
the first portion of the elastic member overlaps the step of the detection device as seen in plan view, and
the detection device is pressed against the casing, with the first portion of the elastic member biasing the step of the detection device toward the casing.

6. The compressor according to claim 1, wherein the detection device has an end face opposite to the detection face, the first portion of the elastic member overlaps at least a part of the end face as seen in plan view, and the detection device is pressed against the casing, with the first portion of the elastic member biasing at least the part of the end face of the detection device toward the casing.

7. The compressor according to claim 1, wherein
the elastic member includes a tubular portion protruding in a direction opposite to the casing and surrounding an outer peripheral face of the detection device.

8. The compressor according to claim 1, further comprising:
a spacer member interposed between the detection face of the detection device and the outer peripheral face of the casing.

9. The compressor according to claim 1, wherein the detection device is an overload protection device.

10. The compressor according to claim 2, wherein the elastic member includes a tubular portion protruding in a direction opposite to the casing and surrounding an outer peripheral face of the detection device.

11. The compressor according to claim 2, further comprising:
a spacer member interposed between the detection face of the detection device and the outer peripheral face of the casing.

12. The compressor according to claim 2, wherein the detection device is an overload protection device.

\* \* \* \* \*